United States Patent

Wehrmann et al.

[11] Patent Number: 5,030,516
[45] Date of Patent: Jul. 9, 1991

[54] COATED SUBSTRATES HAVING AN ULTRATHIN, SINGLE-LAYER OR MULTILAYER COATING, A PROCESS FOR THEIR PRODUCTION AND POLYESTERS AS INTERMEDIATE PRODUCTS FOR THE COATED SUBSTRATES

[75] Inventors: Rolf Wehrmann; Heinrich-Christian Schopper, both of Krefeld, Fed. Rep. of Germany; Dittmar K. Nerger, Pittsburgh, Pa.

[73] Assignee: Bayer Aktiengesellschaft, Leverkusen, Fed. Rep. of Germany

[21] Appl. No.: 404,727

[22] Filed: Sep. 8, 1989

[30] Foreign Application Priority Data

Sep. 10, 1988 [DE] Fed. Rep. of Germany ....... 3830862

[51] Int. Cl.$^5$ .................. B32B 27/06; B32B 27/36
[52] U.S. Cl. .................. 428/480; 427/407.1; 528/176; 528/272
[58] Field of Search .................. 427/402, 407.1; 428/480, 482; 528/176, 272

[56] References Cited

U.S. PATENT DOCUMENTS 4,418,122 11/1983 Rieder et al. .................. 528/176 X
4,886,685 12/1989 Wegner et al. .................. 427/430.1
4,960,635 10/1990 Erdelen et al. .................. 428/220

*Primary Examiner*—Michael Lusignan
*Attorney, Agent, or Firm*—Sprung Horn Kramer & Woods

[57] ABSTRACT

Coated substrates having an ultrathin, single-layer or multilayer coating of organic polymer material have been found, in which coated substrates the polymer used is a polyester of the structure

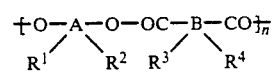

wherein
A is the skeleton of an aliphatic, araliphatic or aromatic diol,
B is the skeleton of an aliphatic, araliphatic or aromatic dicarboxylic acid,
n assumes values from 2 to 80 and at least one of the substituents $R^1$ to $R^4$ represents an aliphatic radical having an essentially normal chain and the other radicals in each case denote hydrogen or methyl, the aliphatic radical having at least 8 C atoms and it being possible for bonding of the aliphatic radical having an essentially normal chain to the skeleton A or B also to take place via groups containing heteroatoms, and, where there are two aliphatic radicals having an essentially normal chain on one skeleton, these radicals are identical, and furthermore $R^1$ and $R^2$ together and $R^3$ and $R^4$ together may form an alkylene chain.

Such coated substrates can be produced by the Langmuir-Blodgett technique. The stated polyesters are novel intermediate products for these coated substrates.

11 Claims, 10 Drawing Sheets

COATED SUBSTRATES HAVING AN ULTRATHIN, SINGLE-LAYER OR MULTILAYER COATING, A PROCESS FOR THEIR PRODUCTION AND POLYESTERS AS INTERMEDIATE PRODUCTS FOR THE COATED SUBSTRATES

BACKGROUND OF THE INVENTION

1. Field of the invention

The present invention relates to novel coated substrates having an ultrathin, single-layer or multi-layer coating, in which coated substrates the coating material is a polyester, and also a process for the production of such coated substrates and novel polyesters as intermediate products for these coated substrates.

Coated substrates have a wide range of applications in industrial technology. For example, the frictional properties of materials can be tailored to a required purpose by modifying the surface. Furthermore, the coating may be a protective film for the substrate underneath, in order to preserve its special surface properties. In particular, however, coated substrates have recently been used as components in structural elements for optical communications technology and as electronic and optoelectronic information stores.

Particularly for the electronic and optical applications, it is necessary to produce ultrathin, defect-free multilayer coatings whose layers have a high degree of order and an adjustable layer thickness which is as homogeneous as possible, and this high degree of order should also be retained when a large number of coating layers are present.

The thin layers produced from the organic polymers form the basis of defect-free systems having order at the molecular level, as required, for example, for

- optical applications (directional radiation with little damping, for example optical waveguides having nonlinear optical properties),
- electrical applications (electrical conductors of high anisotropy, for example one-dimensional or two-dimensional conductors in the field of molecular electronics),
- "host lattices" for defined incorporation or specific binding of functional groups or molecules (for example biomolecules for sensors).

2. Description of the Related Art

It is already known that monomolecular layers can be produced from amphiphilic low molecular weight molecules, each having a polar or nonpolar end, such as, for example, long-chain fatty acids, on the surface of a non-solvent, such as water, in which monomolecular layers all polar ends are directed, for example, towards water, while the nonpolar ends project into the gas space above. For this purpose, small amounts of such amphiphilic substances are dissolved in a suitable solvent and, for example, introduced onto a water surface of sufficient size, where they spread, with evaporation of the solvent, to form an initially noncohesive, monomolecular layer. By moving a suitable barrier, the water surface is reduced in size and the resulting increase in the surface tension is measured as a function of the area still available (that is to say the surface pressure/area graphs which are known to those skilled in the art and are also known as $\pi/A$ isotherms, are recorded).

This gives a cohesive, monomolecular layer exhibiting order at the molecular level. When this quasi-solid state of this monomolecular layer is reached, further movement of this barrier meets with a clearly measurable resistance, which indicates that this state has been reached. Suitable substrates can then be immersed through the monomolecular layer into the water and in turn become coated with a monomolecular layer of the amphiphilic substance during immersion and/or withdrawal, the monomolecular order in the individual layers being retained.

The stated process can be repeated. This coating technique is known to the skilled worker as the Langmuir-Blodgett technique.

However, coatings of monomeric amphiphilic substances are chemically, thermally and mechanically unstable, that is to say the molecular order may be lost through chemical and/or physical effects. Attempts have therefore been made to coat substrates with amphiphilic substances having a reactive double bond or multiple bond and subsequently to crosslink the said substances to give a polymer, for example by means of high-energy radiation.

Frequently investigated examples for the polymerization of unsaturated amphiphilic substances are diacetylenecarboxylic acids and $\omega$-tricosenoic acid. The serious disadvantages of these substances are their high reactivity, with the result that they are often difficult to obtain in pure form. In the course of the polymerization, after transfer onto the substrate, shrinkage often results in defects, such as macroscopic cracks in the coating.

Attempts have also been made to include polymeric substances, such as polystyrene and polymethyl methacrylate, in the Langmuir-Blodgett technique. However, polymers give rise to difficulties in the alignment of the polar or the nonpolar structural components, owing on the one hand to the random disorder in the polymer chain and on the other hand to superstructures of the polymers. It is therefore always necessary to determine whether the amphiphilicity (that is to say the difference in polarity between the polar and the nonpolar groups) is sufficient to obtain coatings of high molecular order and good reproducibility. The so-called Y structure, in which the polar and the nonpolar structural elements are located opposite one another from one layer to the other in multilayer coatings, is frequently desirable here. For special applications, for example nonlinear optically active layers, this Y structure may be disadvantageous; with the polyesters described further below, it is also possible to produce layers of the X or Z type under suitable experimental conditions. In Journal of Molecular Electronics 1 (1985), 3-17, the subject matter discussed is described in detail.

SUMMARY OF THE INVENTION

Coated substrates having an ultrathin, single-layer or multilayer coating of organic polymer material have now been found, which are characterized in that the polymer used is a polyester of the structure wherein A is the skeleton of an aliphatic, araliphatic or aromatic diol, B is the skeleton of an aliphatic, araliphatic or aromatic dicarboxylic acid, n assumes values from 2 to 80 and at least one of the substituents $R^1$ to $R^4$ represents an aliphatic radical having an essentially normal chain and each of the other radicals denotes hydrogen or methyl, the aliphatic radical having at least 8 C atoms and it being possible for bonding of the aliphatic radicals having an essentially normal chain to the skeleton A or B also to take place via groups containing heteroatoms, and, where there are two aliphatic radicals having an essentially normal chain on one skeleton, these radicals are identical, and furthermore $R^1$ and $R^2$ together and $R^3$ and $R^4$ together may form an alkylene chain.

A process for the production of such coated substrates has also been found, which is characterized in that a solution of the stated polyester is introduced onto the surface of a liquid in which neither the polyester nor its solvent dissolves, and a substrate is provided with the desired number of coating layers by the Langmuir-Blodgett technique.

The invention furthermore relates to the stated polyesters as intermediate products for the coated substrates.

BRIEF DESCRIPTION OF THE DRAWINGS

FIGS. 1.1 to 1.8 show various $\pi/A$ isotherms which were recorded using polymers 1 to 8 described in more detail below.

DETAILED DESCRIPTION OF THE INVENTION

In the polyesters of the formula (I), the ester bonds each represent the polar groups, while the aliphatic radicals $R^1$ to $R^4$ essentially having a normal chain represent the nonpolar groups. The aliphatic radicals have an essentially normal chain, that is to say they have a degree of branching of not more than one methyl group per 8 carbon atoms in the chain. In the case of very long chains, the branching may also involve short $C_2$–$C_4$-chains within the stated degree of branching. Preferably, however, aliphatic radicals which strictly have a normal chain are present in the polyester according to the invention.

At least one of the substituents $R^1$ to $R^4$ represents an aliphatic radical having an essentially normal chain, while those substituents $R^1$ to $R^4$ which do not denote such aliphatic radicals represent hydrogen or methyl. The aliphatic radicals have at least 8 C atoms, for example 8-32, preferably 8-28, particularly preferably 8-22, C atoms. The aliphatic radicals are bonded to the skeleton A or B.

If the radicals $R^1$ to $R^4$ represent aliphatic radicals which have an essentially normal chain, the radicals $R^1$ and $R^2$ bonded to one skeleton are identical; $R^3$ and $R^4$ are likewise identical but may be different from $R^1$ and $R^2$. Furthermore, $R^1$ and $R^2$ together and likewise $R^3$ and $R^4$ together, but independently of $R^1$ and $R^2$, may form an alkylene chain, which in each case may have 8 to 32 C atoms. Preferably used polyesters are those which contain only 1 or 2 aliphatic radicals, having essentially a normal chain, per structural unit, and the said radicals may be bonded both to the skeleton A and to B. In the case of two radicals, it is furthermore preferable for both to be bonded either to the skeleton A or to B.

Aliphatic radicals having an essentially normal chain, and alkylene chains of the stated type formed from $R^1$ and $R^2$ together or $R^3$ and $R^4$ together, are familiar to the skilled worker.

Polyesters of the formula (I) can be prepared, in a manner known to the skilled worker, from diols of the formula or their esters with low-boiling aliphatic carboxylic acids, such as acetic acid, propionic acid or butyric acid, preferably with acetic acid, and dicarboxylic acids of the formula or their acyl chlorides or acyl bromides or their esters with lower aliphatic alcohols, such as methanol, ethanol, propanol or butanol, preferably with methanol or ethanol, in which $R^1$, $R^2$, $R^3$ and $R^4$ have the abovementioned meaning.

Examples of such known methods of preparation are
a) reaction of a diol with a dicarboxylic acid with elimination of water;
b) reaction of a diol with a dicarboxylic ester of the stated type with elimination of a lower alcohol;
c) reaction of a diol with a dicarboxylic chloride (bromide) with elimination of HCl (HBr), for example by interfacial polycondensation;
d) reaction of a diol ester of the stated type with a dicarboxylic acid.

If necessary, such reactions are catalytically accelerated. Important reactions are those according to b), c) and d); particularly important are those according to b), those according to c) in the case of aromatic dicarboxylic acids and those according to d) in the case of aromatic diols.

In the preferred case where only one of the skeletons A or B carries 1 or 2 aliphatic radicals having an essentially normal chain, the other skeleton in each case is the skeleton of a diol or of a dicarboxylic acid, as otherwise used for the preparation of polyesters.

A and B independently of one another may be the skeleton of an aliphatic, cycloaliphatic, aromatic or araliphatic diol or a dicarboxylic acid (if appropriate, as an ester or acyl halide). The aliphatic part may have, for example, 2-20, preferably 2-12, particularly preferably 2-8, C atoms, and in the case of malonic acid only 1 C atom. The cycloaliphatic part may have, for example, 5-10, preferably 6-8, C atoms. The araliphatic part may have, for example, 7-30 C atoms. The aromatic part may have, for example, 6-12, preferably 6-10, C atoms.

If several aromatic nuclei occur in the araliphatic or aromatic parts, these nuclei may be bonded by ether bridges, ketone bridges, $SO_2$ groups and/or by $C_1$–$C_6$-alkylene or cycloalkylene groups.

Aliphatic parts may furthermore be branched and may be interrupted by O atoms or by NH or N-$C_1$–$C_4$-alkyl groups.

Such radicals are known to the skilled worker from polyester chemistry for diols or dicarboxylic acids or for their abovementioned derivatives.

Examples of diols without an aliphatic radical having an essentially normal chain are: N,N-dihydroxyethyl, N-methylamine, ethylene glycol, diethylene glycol, tetraethylene glycol, 1,2- and 1,3-propanediol, 1,4-butanediol, 1,6-hexanediol, 1,4-cyclohexanediol, pyrocatechol, resorcinol, hydroquinone, 4,4'-dihydroxydiphenyl, 4,4'-dihydroxydiphenyl ether, 4,4'-dihydroxybenzophenone, 2,2-bis-(4-hydroxyphenyl)-propane (=bisphenol A) and araliphatic diols of the following formulae This list is in no way exhaustive but merely typical.

Examples of dicarboxylic acids (in the form of the free acids, their esters or their acyl halides) without an aliphatic radical having an essentially normal chain are: malonic acid, succinic acid, glutaric acid, adipic acid, phthalic acid, terephthalic acid, isophthalic acid, 4,4'-diphenyldicarboxylic acid, 4,4'-phenoxyphenyldicarboxylic acid and many others, and this list too is not exhaustive but merely typical.

The aliphatic radicals having an essentially normal chain can be bonded via a C—C bond to the skeleton A or B. For example, malonates can be monoalkylated or dialkylated with long-chain alkyl halides and used as an ester or acyl chloride. Reduction, for example with LiAlH$_4$, converts the malonates into the corresponding diols (for example 2,2-distearyl-1,3-propanediol).

Aliphatic parts of A may furthermore be branched and may carry 1 to 3 further OH groups, preferably 1 or 2 further OH groups, to which the aliphatic radical having an essentially normal chain is bonded, so that in the end a diol remains. Examples of diols of the last-mentioned type are: glycerol monostearate, trimethylolpropane monostearate or pentaerythritol distearate, which can be prepared, for example, by blocking two OH groups followed by reaction with a long-chain acyl chloride and elimination of the protective group.

Aliphatic parts of A may furthermore contain an N atom, which can be alkylated or quaternized with the aid of long-chain alkyl halides. In such a case, the aliphatic radical having an essentially normal chain is bonded to the skeleton A via an N atom. Furthermore, the long-chain radical can be bonded to such an N atom via a carbonyl group, a sulphonyl group, a 4-hydroxyphenylcarbonyl group or a 4-hydroxyphenyl(-naphthyl- or -anthryl-)sulphonyl group.

Aromatic parts for A and long radicals can be bonded in a corresponding manner via a C—C bond, an ether O atom, a —CO— group, an —O—CO—group, an —N-H—CO— group, a sulphonyl group or a sulphonamido group.

The substances mentioned by way of example may be represented by the following formulae:

where $R^5 = C_9H_{19}$, $C_{11}H_{23}$, $C_{13}H_{27}$, $C_{15}H_{31}$, $C_{17}H_{35}$, etc.;

where
$R^6 = R^5$ or $C_8H_{17}$, $C_{10}H_{21}$, $C_{12}H_{25}$, $C_{14}H_{29}$, $C_{16}H_{33}$, $C_{18}H_{37}$, etc.,
$R^7 = H$, $R^5$ or $R^6$ and
$Hal^- = Cl^-$ or $Br^-$;

where
$R^8 = H$, $R^9 = C_9H_{19}$
$R^8 = H$, $R^9 = C_{17}H_{35}$
$R^8 = CH_3$, $R^9 = C_9H_{19}$
$R^8 = R^9 = C_9H_{19}$
$R^8 + R^9 = —C_{11}H_{22}—$

(the last compound can be prepared from cyclododecanone and 2 moles of phenol);

where $R^{12} = C_{10}H_{21}, C_{14}H_{29}, C_{18}H_{37}$, etc.;

The degree of polymerization of the polyesters according to the invention is indicated by the index n having values from 2 to 80, preferably 2 to 50. Such polyesters are obtained in general as a mixture having different degrees of polymerization. These mixtures can be used directly for coating solid substrates.

Suitable substrates for the coated substrates according to the invention are workpieces which are flat or of another form, preferably symmetrical and dimensionally stable. They may be optically transparent or opaque and electrically conductive, semiconducting or insulating.

For example, the surface of a substrate can in turn consist of an insulator having an applied conductive metal layer or, conversely, of a metal and a coating comprising an insulating layer. To achieve the high order within the coated substrates according to the invention, the surface of the substrate should as far as possible have only low microroughnesses (in the range from 20 to 100 Å according to DIN 4,768). Apart from the flat form of the substrate, for example, cylindrical or semicylindrical shapes and spherical segment shapes are suitable. Furthermore, the surface of the substrates can be rendered hydrophilic or hydrophobic by physical or chemical treatment. In general, the substrate surfaces are subjected to a cleaning procedure prior to coating. The solid substrates may consist both of inorganic and of organic materials. Examples of inorganic materials are metals and alloys, such as gold, platinum, nickel, palladium, aluminium, chromium, steel, etc., and non-metals or oxidic substances, such as silicon, silica, glass, graphite, mica and ceramic materials. From the group consisting of the organic materials, polymeric materials, such as polyesters (polyethylene terephthalate, polybutylene terephthalate, etc.), polyvinyl chloride, polyvinylidene fluoride, polytetrafluoroethylene, polycarbonate, polyamide, etc., may mentioned in particular. The choice of the substrate is determined by the particular intended use. In the case of optical investigations or applications, for example, transparent or reflecting substrates are therefore used. If electrical properties are of interest, substrates which are metallized and hence conductive or semiconducting (for example silicon or ITO (ITO = indium tin oxide) or, if required, insulators are used.

Dimensionally stable, flat, even substrates, such as films, foils, tapes, etc. are particularly suitable. Coating may be effected on one or both sides.

In the Langmuir-Blodgett technique, solutions of the polyesters are prepared. Suitable solvents are methylene chloride, chloroform, trichloroethane, benzene, hexane, ethyl acetate and similar solvents known to the skilled worker, as well as mixtures of these solvents. Only in a few cases is it necessary to add strongly polar solvents, such as methanol, ethanol, dimethyl sulphoxide, dimethylformamide or N-methylpyrrolidone to improve the solubility. The concentration of such polyester solutions is in general adjusted to $10^{-2}$ to $10^{-4}$ mol/1. Such a solution is applied to the surface of a liquid in which neither the polyester nor its solvent dissolves. The most important of these liquids are water and aqueous solutions of salts, acids or bases, preferably pure water. To avoid rendering the solvent for the polyester excessively soluble in water, the abovementioned strongly polar solvents may be used only in minor amounts.

While the solvent evaporates or small amounts of the strongly polar solvent are taken up by the water, the polyester dissolved therein spreads out and is compressed to the desired transfer pressure with the aid of a mobile barrier, so that a closed layer exhibiting order on the molecular scale is present ("quasi-solid" or "solid-analogous" phase). By immersing the substrates, coating is then effected by a procedure repeated as often as required to produce the desired number of coating layers. This transfer is effected in general at a temperature of 5°–35° C., preferably 10°–30° C.

The random coiling of the chains to be observed in polymers, and other irregularities, also made it likely that there would be corresponding defects in the coated substrates. Surprisingly, in the substrates coated according to the invention, this is the case to a substantially lesser extent, so that multilayer coatings having a high degree of order and virtually identical, adjustable layer thicknesses are obtained.

EXAMPLES

Starting materials and apparatuses

The polyesters used were produced in a conventional manner by reaction of the diols or their diacetates with the dicarboxylic acids or their acyl chlorides or their diethyl esters and were purified by reprecipitation. The polyesters in question are the following polyesters ("Poly") represented by the formulae:

Poly 1

Poly 2

Poly 3

Poly 4

Poly 5

Poly 6

Poly 7

Poly 8

For the production of the monolayers and multi-layers, either a commercially available film balance from KSV Chemicals, Helsinki, or one from MGW Lauda, Lauda-Königshofen was used. The effectively usable trough area of the KSV film balance was 1275 cm² in the π/A isotherm measurement and 1175 cm² in coating experiments. The rate of advance of the barrier was 31 mm/min in the π/A isotherm measurement, corresponding to a reduction in area of 7750 mm²/min; for the Lauda film balance, the following values are obtained: trough area 990 cm², rate of advance 33 mm/min and reduction in area 6600 mm²/min. When multilayers were being produced, the barrier velocity was adapted in each case to the monolayer behaviour. FIGS. 1.1 to 1.8 show various π/A isotherms, of which only the curve shown in FIG. 1.1 will be discussed in detail, since the results can be directly extrapolated to the other Examples. FIG. 1.1 was recorded using Poly 1, FIG. 1.2 with Poly 2, FIG. 1.3 with Poly 3, FIG. 1.4 with Poly 4, FIG. 1.5 with Poly 5, FIG. 1.6 with Poly 6, FIG. 1.7 with Poly 7 and FIG. 1.8 with Poly 8.

Figure 11:
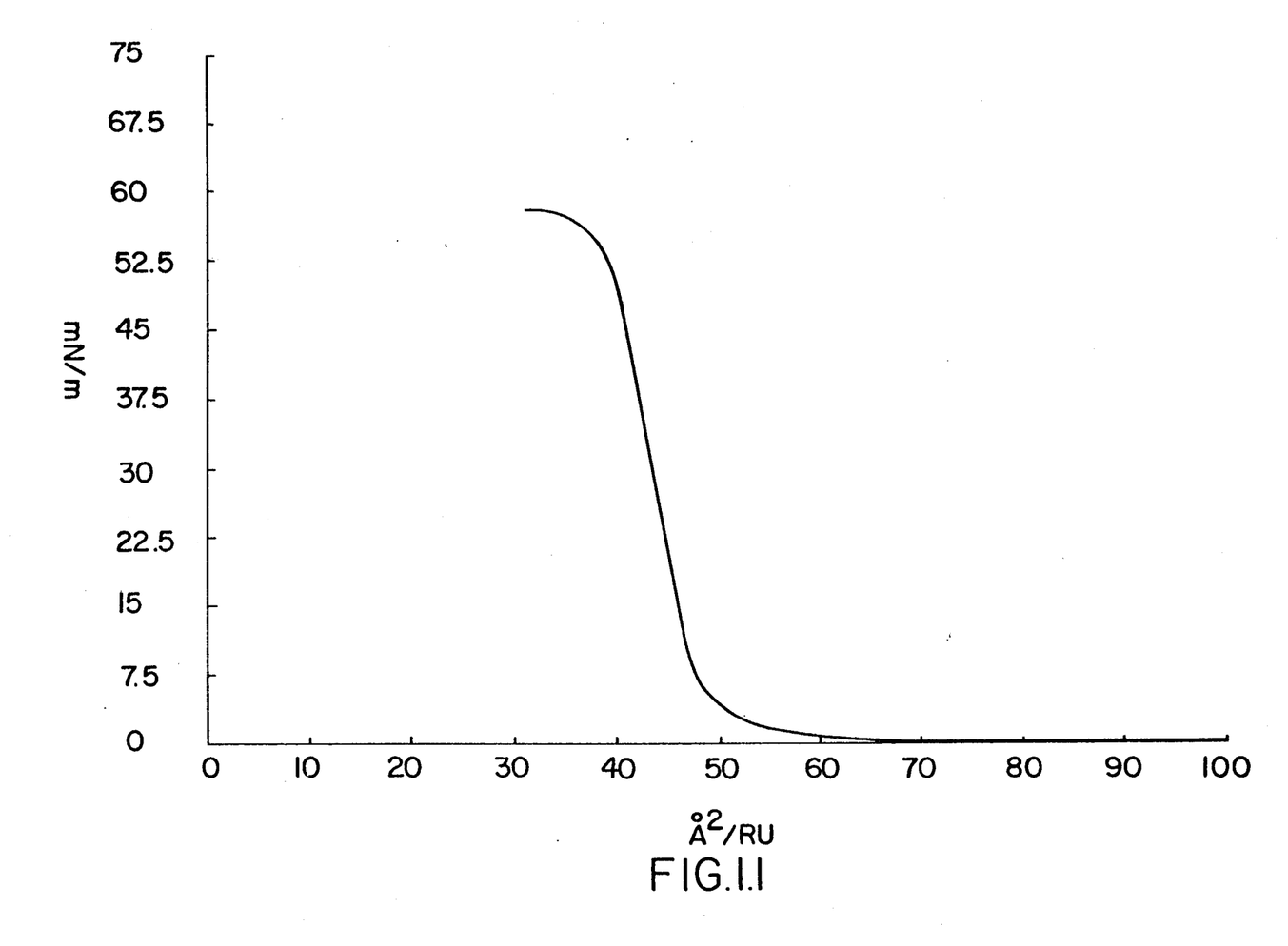
Figure 12:
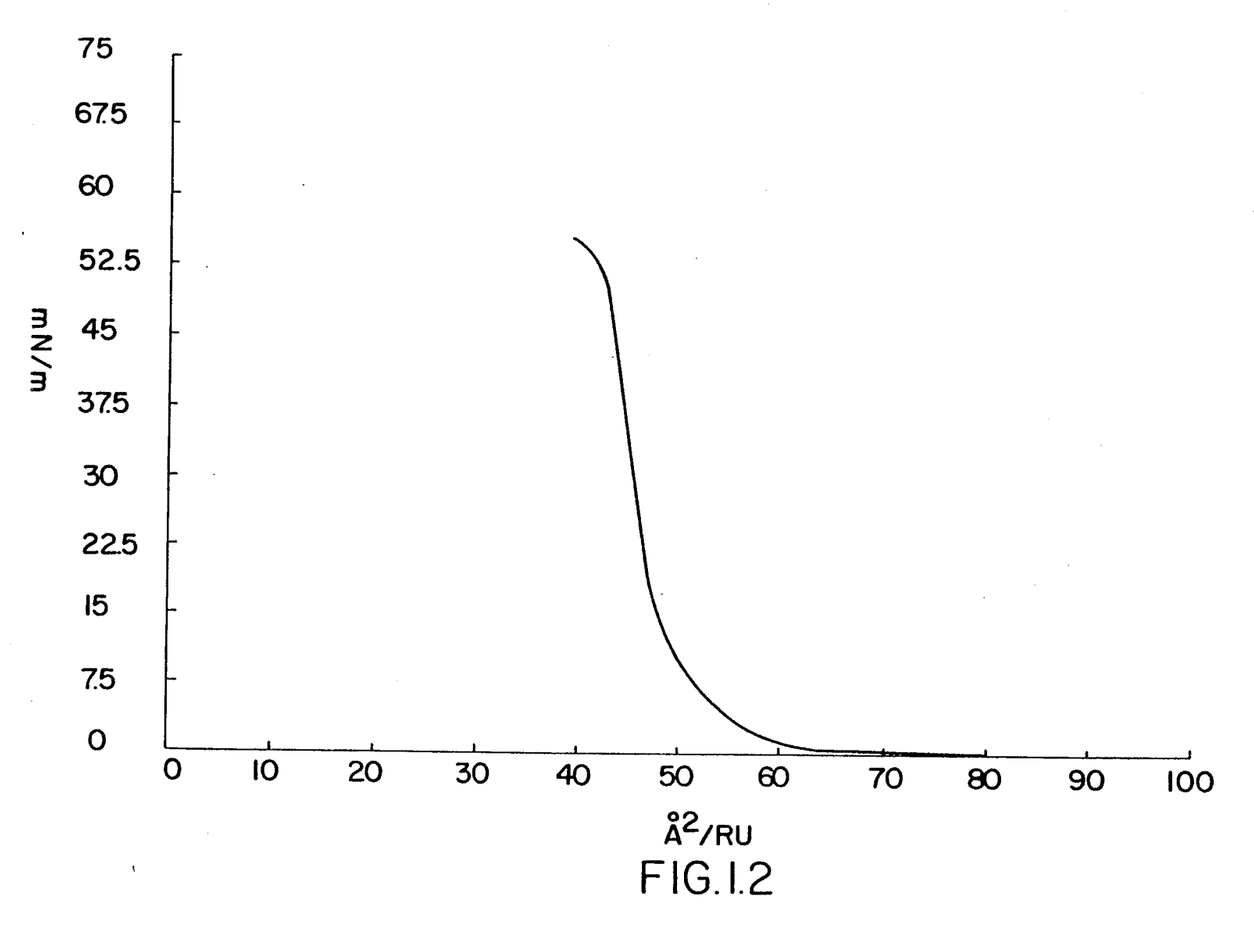
Figure 13:
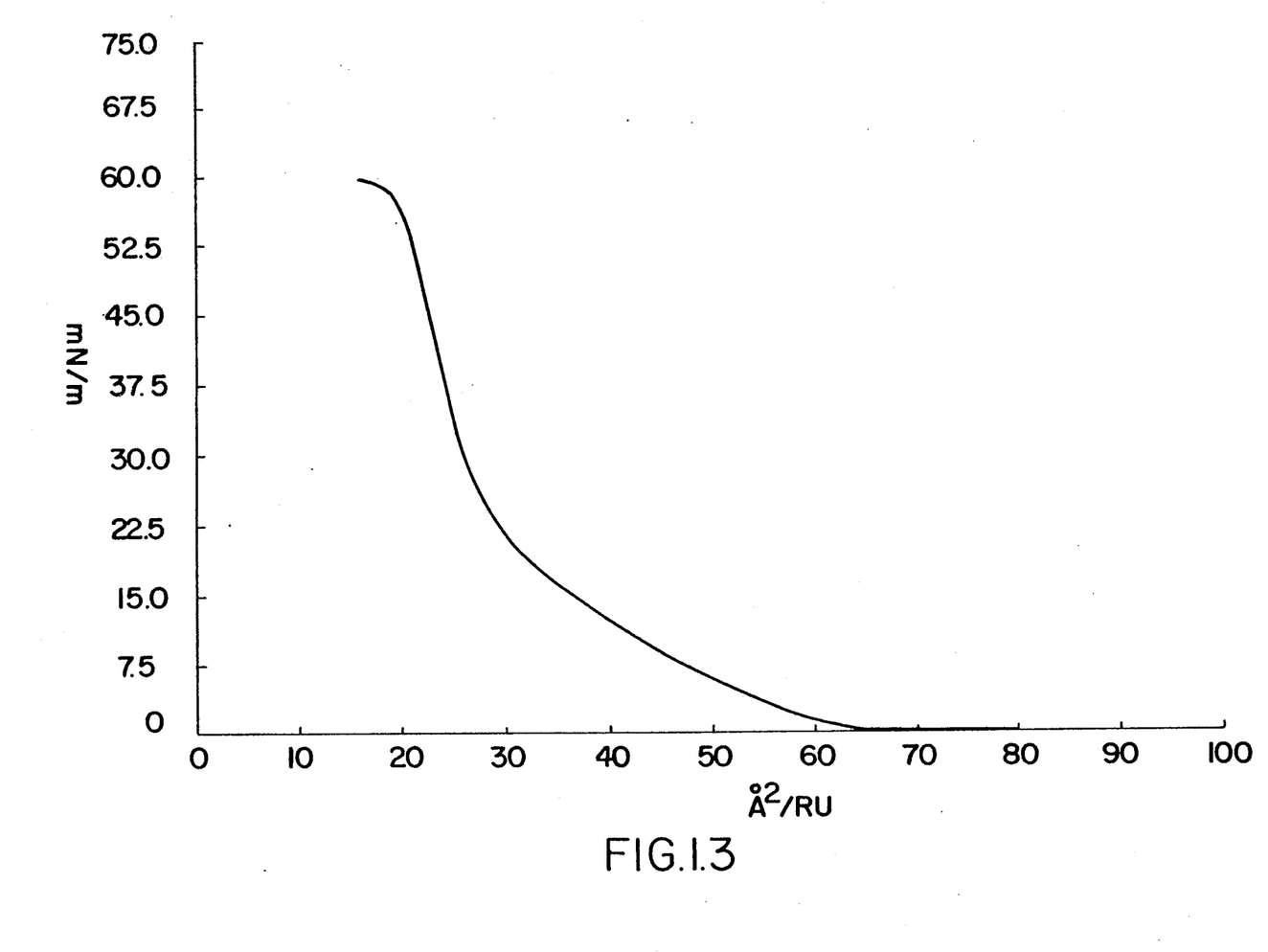
Figure 14:
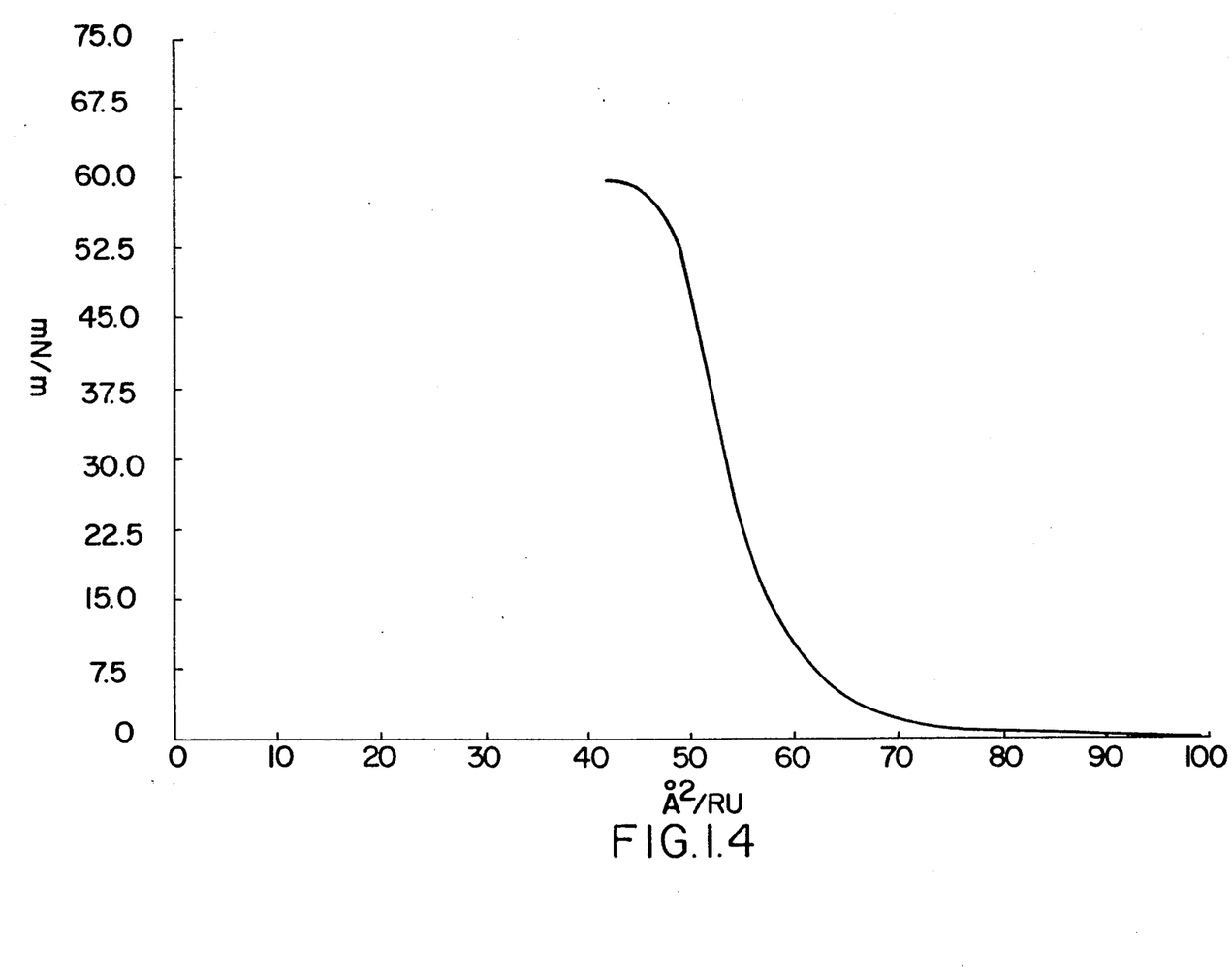
Figure 15:
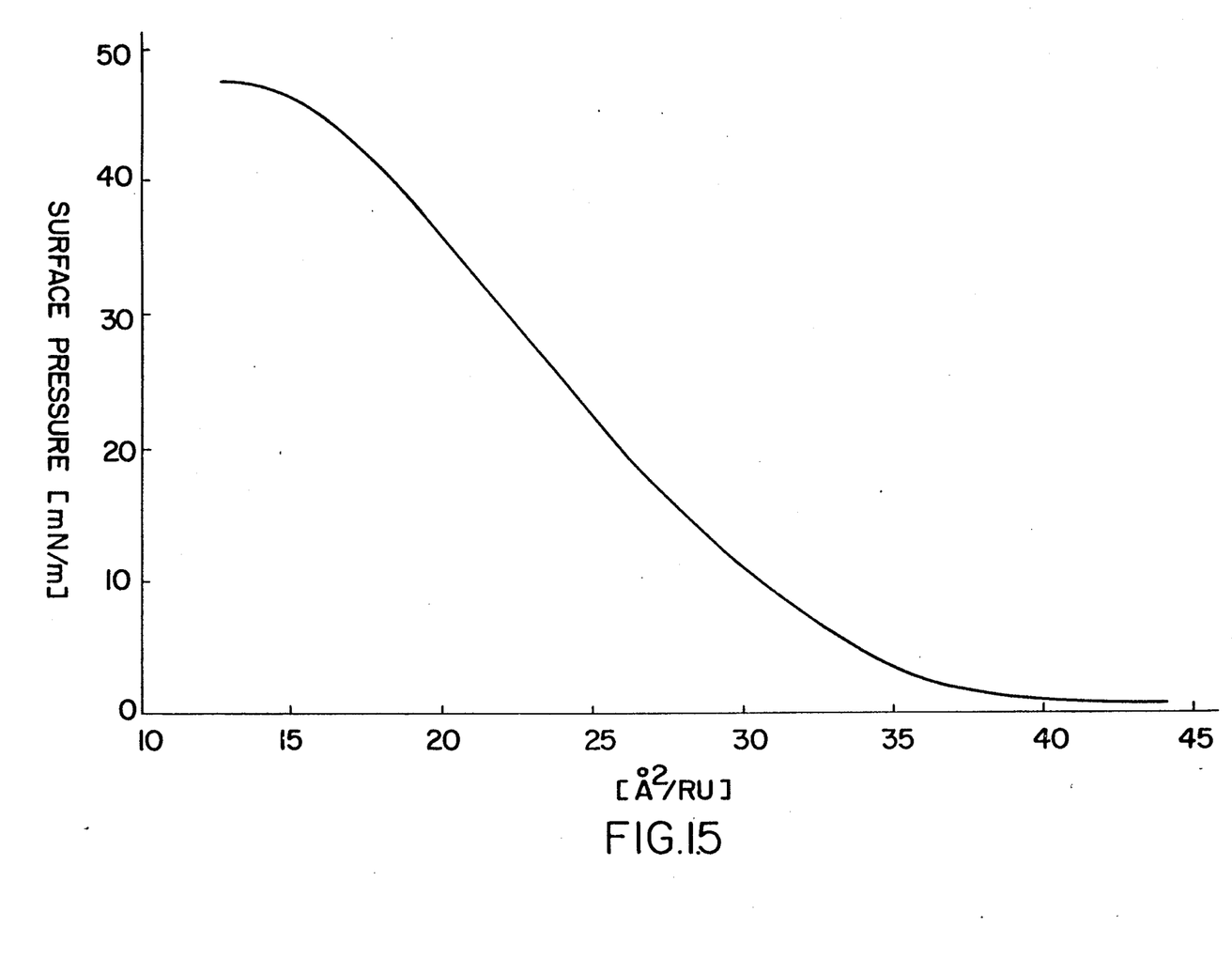
Figure 16:
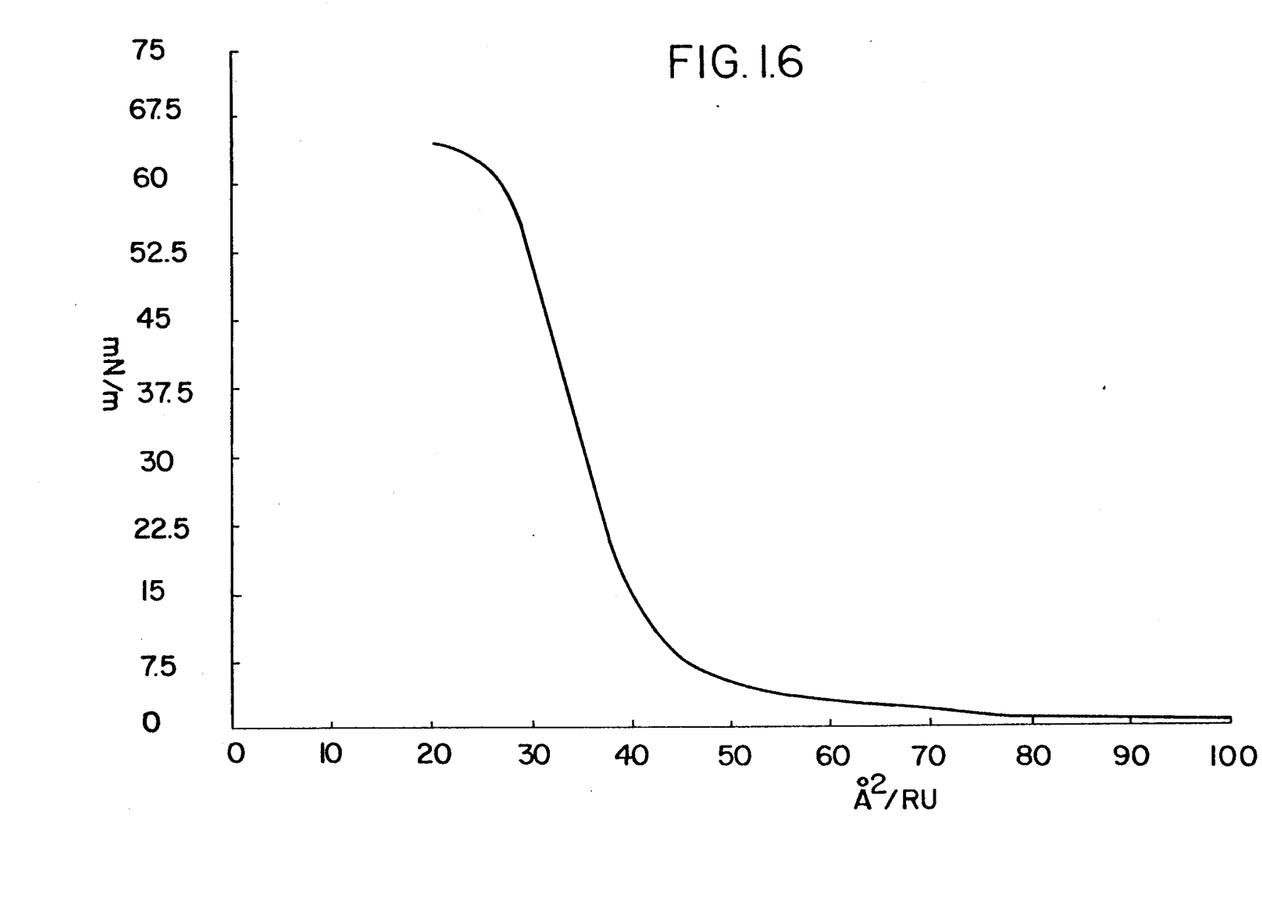
Figure 17:
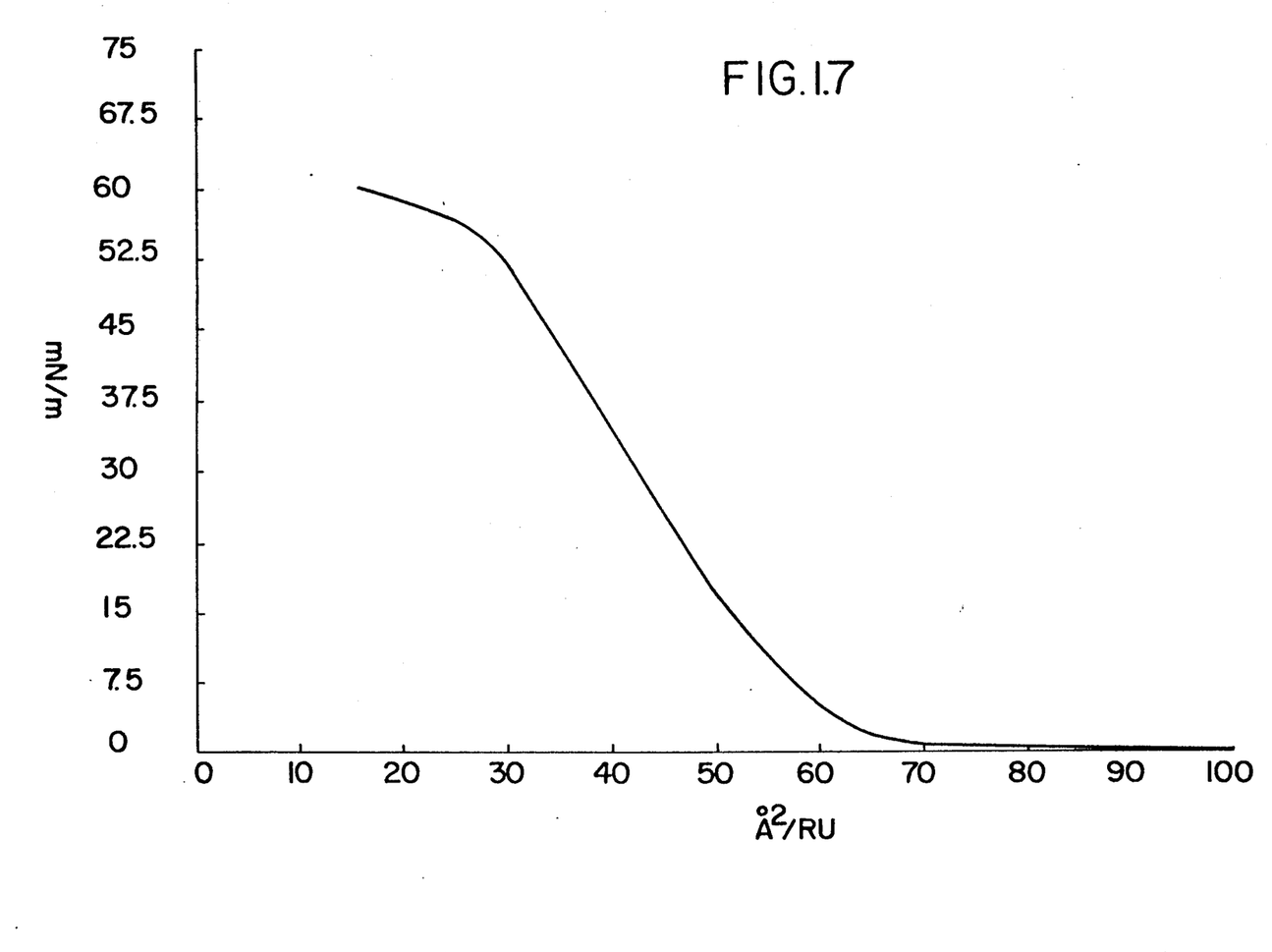
Figure 18:
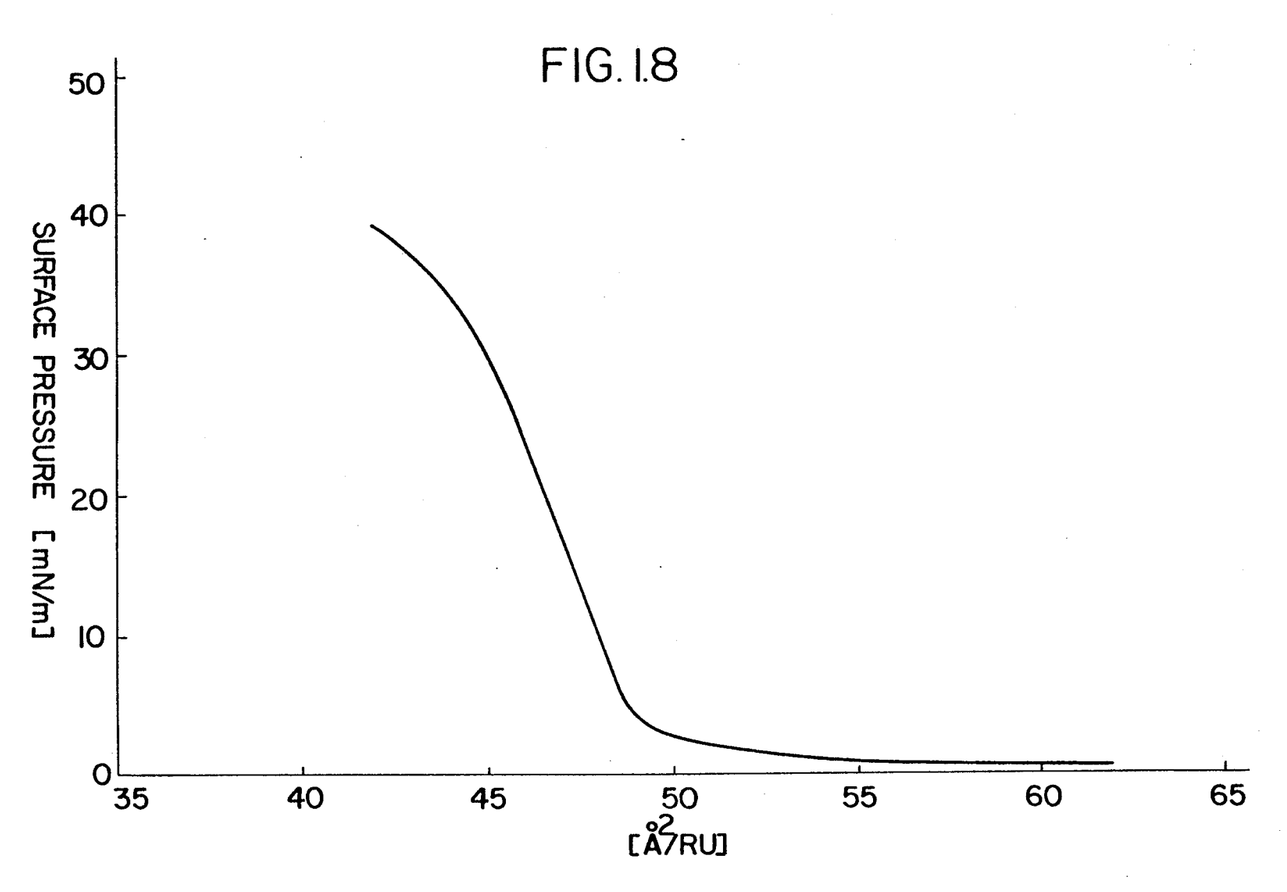

To record these π/A isotherms, 9.63 mg of polyester were dissolved in 10 ml of chloroform (analytically pure) ($1.42 \times 10^{-3}$ mol/l). The applied amount was 50 μl. The measurement was carried out at room temperature. A noticeable increase in pressure occurred from about 65Å²/RU (RU = Repeat Unit). The collapse point was at about 40Å²/RU and at a pressure of about 50 mN/m.

The occupied area of 40Å²/RU at the collapse point is in good agreement with the value known from the literature and expected for double-chain amphiphilic substances, as the area occupied by an alkyl chain is 18–20Å². The polyester measured was obtained from the parent double-chain diol and the parent diethyl dicarboxylate. It is clear that the area occupied is accounted for virtually exclusively by the two alkyl chains. From the shape of the π/A isotherms, it can therefore be concluded that the polymer skeleton lies with its polar ester groups flat on the water surface, and the nonpolar alkyl side chains project into the gas space. The orientation of the hydrophilic and of the hydrophobic groups, even when they are incorporated in a polyester, is thus directly comparable with that of the conventional amphiphilic substances, such as long-chain fatty acids or alcohols.

Polycarbonate (PC) film (thickness 500 μm, average peak-to-valley height Ra≦70 Å) coated on one side with Al by sputtering served as the reflecting substrate for optical investigations. The thickness of the Al layer was about 660 Å, and densitometric measurements of the optical density gave a value of 3.54. Before metallization, the surface was exposed for 5 minutes to a d.c. voltage glow discharge (O₂ partial pressure $2 \times 10^{-2}$ mbar, power about 60 W).

Silicon (Wacker-Chemitronic) served as the substrate for the structural investigations by X-ray diffraction. Platelets of 76 mm length and 26 mm width were cut out from discs, which were about 380 μm thick and polished on one side (20 Å≦Ra ≦40 Å, orientation (111), diameter 3 inches) and the said discs were freed from dust and chemical contaminants in an ultrasonic bath immediately before coating.

Examination of the surfaces of the layers on the metallized side of the PC substrate or on the polished side of the Si substrate by interference contrast microscopy (magnification 100 to 500 times) showed very smooth, homogeneous surfaces; isolated defects are due to film defects or to damage to the Si substrate which occurred during cutting, and to dust.

The thickness of the multilayers on the metallized side of the PC substrate was determined ellipsometrically at various points at a wavelength of 632.8 nm (He-Ne laser) (apparatus: Rudolf Research, Type Auto-EL); the angle of incidence was 70° and the diameter of the measured spot was about 1 mm. Over 15 to 25 individual measurements (step interval 1/10 to 1/20 inch with microslide) were averaged per multilayer; the maximum experimental error was ±0.5 Å.

The corresponding angular values for the layer were calculated from the ellipsometer angles γ and Δ of the total system (substrate and coating) and of the uncoated substrate, and the total layer thickness was determined from the said angular values.

Figure 2:
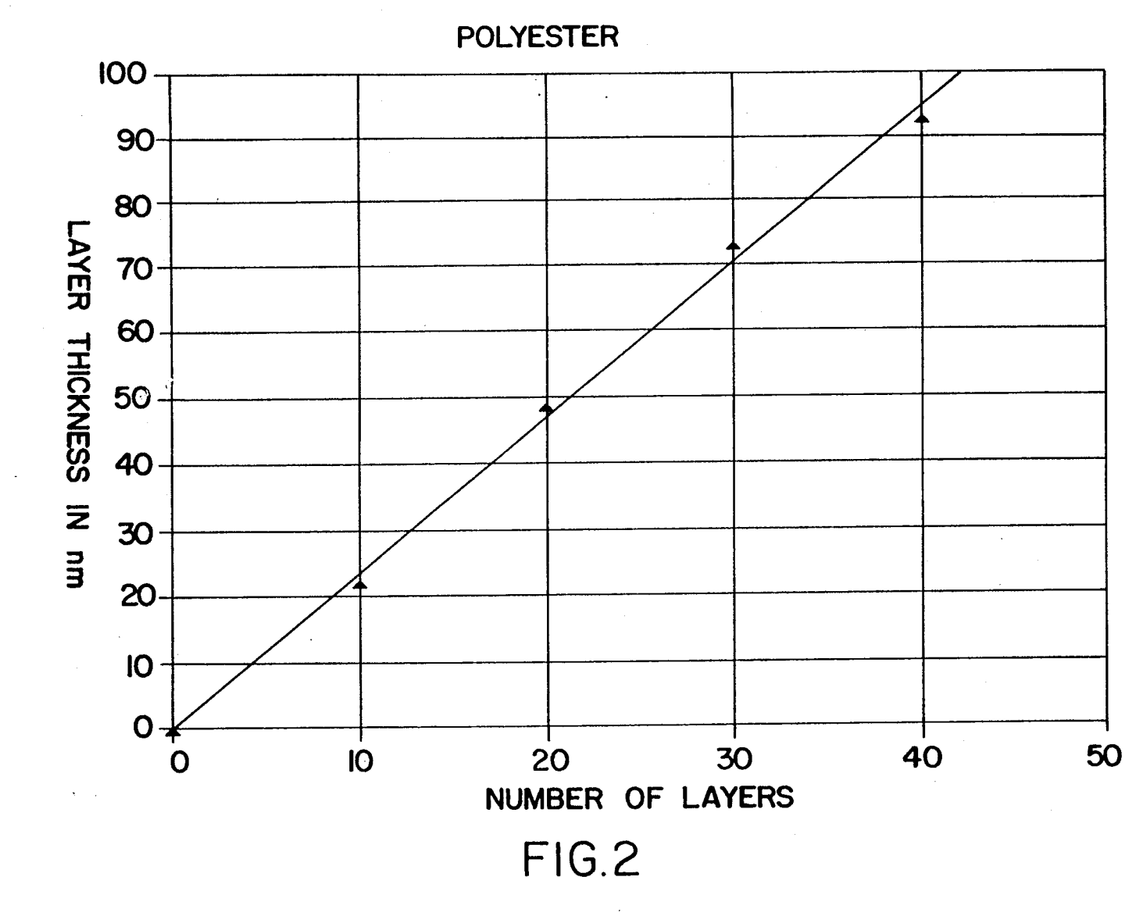
FIG. 2 shows the result of a point-to-point ellipsometric layer thickness determination.

FIG. 2 shows the result of a point-to-point ellipsometric layer thickness determination for a sample of compound 1 with areas which have been immersed different numbers of times (10 times, 20 times, 30 times and 40 times), that is to say with areas which consist of stacks of 10, 20, 30 and 40 individual layers of Poly 1. There is a linear relationship between the total thickness of the coating and the number of immersion cycles. This proves that each individual layer of polyester makes the same contribution to the total layer thickness, that is to say, when the multilayers are being built up, transfer occurs layer by layer in the same manner and reproducibly, which is a precondition for a well organised molecular structure. The mean thickness $d_0$ of an individual layer is obtained from the slope of the straight lines in FIG. 2 ($d_0$ is equal to the film thickness divided by the number of layers). It is 23.8 ±1.4 Å (error limits: standard deviation of 0.9 Å plus experimental error of not more than 0.5 Å) and is in good agreement with literature values for structurally related double-chain phospholipids.

The structure of the multilayers on the polished side of the Si substrate was investigated by X-ray diffraction. A gravitationally symmetric X-ray diffractometer (Seifert, Type GSD) was used, Cu-K$_{60\ 1}$ radiation ($\lambda = 1.5405$ Å) being employed. The diffraction patterns were recorded only in the small-angle range of $2° < 2\theta < 15°$; in this range, no Si reflections occur, this being confirmed by our own X-ray diffraction experiments on the uncoated Si substrate.

Figure 3:
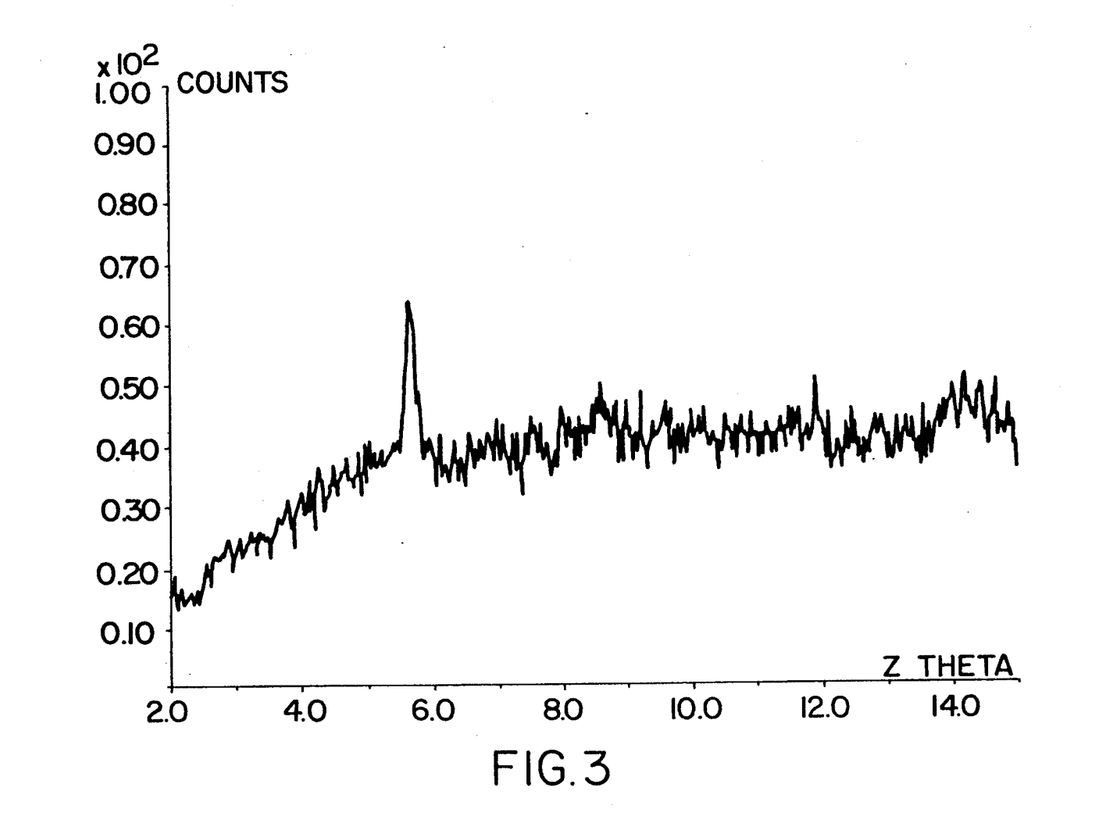
FIG. 3 shows the X-ray diffraction pattern measured for 20 layers of mentioned polymer 1.

The measurements were carried out by the reflection technique; the sample was arranged so that the scattering vector was oriented at right angles to the plane of the multilayers; hence, only reflections having the general Miller indices n.(001) (n is a positive integer) were to be expected. FIG. 3 shows the X-ray diffraction pattern measured in this manner for 20 layers of Poly 1. A reflection at $2\theta = 5.7°$ is clearly detectable, this reflection being a lattice spacing $d_{001} = 15.5$ Å (generaly: Bragg equation $d_{001} = 1.\lambda/2\ \sin\theta$; $\lambda =$ wavelength of the X-ray radiation). Its relatively low intensity is due to the small number of individual layers and to the low atomic form factor of the atoms involved (this is proportional to the number of electrons of the scattering atom, that is to say not more than 8 in the case of oxygen).

Substances which are closely related with regard to the chain structure, such as $\beta$-stearic acid (ASTM Card No. 9-622) and behenic acid (ASTM Card. No. 29-1561) have an isolated, relatively intense (003) reflection at d values of 14.6 Å and 15.9 Å, respectively. Assuming that the reflection observed is the (003) reflection, the value obtained for the layer spacing $C_0$ ($d_{001} \cdot 1 = C_0$), which corresponds to the thickness of a double layer (Y process), is $46.5 \text{Å} \pm 1 \text{Å}$, that is to say the thickness of an individual layer is $23.3 \text{Å} \pm 1 \text{Å}$. This is in very good agreement with the value determined by ellipsometry.

Thus, it has been proved not only that the multilayers composed of the polyester can be transferred reproducibly layer by layer to solid substrates but also that the molecular order of polymerized molecules compressed in a solid-analogous phase is retained. Structural investigations of this type into polymers of the type described in this application are not known from the literature.

What is claimed is:

1. A coated substrate having an ultrathin, singlelayer or multilayer coating of organic polymer material, characterizsd in that the polymer used is a polyester of the structure wherein
A is the skeleton of an aliphatic, araliphatic or aromatic diol,
B is the skeleton of an aliphatic, araliphatic or aromatic dicarboxylic acid,
n assumes values from 2 to 80 and
at least one of the substituents $R^1$ to $R^4$ represents an aliphatic radical having an essentially normal chain and each of the other radicals denotes hydrogen or methyl, the aliphatic radical having at least 8 C atoms and it being possible for bonding of the aliphatic radicals having an essentially normal chain to the skeleton A or B also to take place via groups containing heteroatoms, and, where there are two aliphatic radicals having an essentially normal chain on one skeleton, these radicals are identical, and furthermore $R^1$ and $R^2$ together and $R^3$ and $R^4$ together may form an alkylene chain.

2. The coated substrate of claim 1, wherein the aliphatic radicals which have an essentially normal chain possess 8-32 C atoms.

3. The coated substrate of claim 2, wherein the aliphatic radicals which have an essentially normal chain possess 8-28 C atoms.

4. The coated substrate of claim 3, wherein the aliphatic radicals which have an essentially normal chain possess 8-22 C atoms.

5. The coated substrate of claim 1, wherein the structural unit of the polymer carries 1 or 2 aliphatic radicals having an essentially normal chain.

6. The coated substrate of claim 5, wherein the structural unit of the polyester carries two aliphatic radicals which have an essentially normal chain and both of which are bonded either to the skeleton A or to the skeleton B.

7. The coated substrate of claim 5, wherein the skeleton of the diol (skeleton A) carries one or two aliphatic radicals having an essentially normal chain.

8. The coated substrate of claim 1, wherein the substituents $R^1$ to $R^4$ have a strictly normal chain.

9. The coated substrate of claim 1, wherein a mixture of several polyesters having different values of n is used as the polyester.

10. A process for the production of a coated substrate having an ultrathin, single-layer or multilayer coating of an organic polymer material, characterized in that a solution of a polyester of the structure wherein
A is the skeleton of an aliphatic, araliphatic or aromatic diol,
B is the skeleton of an aliphatic, araliphatic or aromatic dicarboxylic acid,
n assumes values from 2 to 80 and
at least one of the substituents $R^1$ to $R^4$ represents an aliphatic radical having an essentially normal chain and each of the other radicals denotes hydrogen or methyl, the aliphatic radical having at least 8 C atoms and it being possible for bonding of the aliphatic radicals having an essentially normal chain to the skeleton A or B also to take place via groups containing heteroatoms, and, where there are two aliphatic radicals having an essentially normal chain on one skeleton, these radicals are identical, and furthermore $R^1$ and $R^2$ together and $R^3$ and $R^4$ together may form an alkylene chain, is introduced onto the surface of a liquid in which neither the polyester nor its solvent dissolves, and a substrate is provided with the desired number of coating layers by the Langmuir-Blodgett technique.

11. The process for the production of coated substrates of claim 10, wherein the liquid in which neither the polyester nor its solvent dissolves is water.

* * * * *